United States Patent
Tanimoto et al.

(10) Patent No.: US 7,605,513 B2
(45) Date of Patent: Oct. 20, 2009

(54) ELECTRIC TOOL HAVING ELECTRIC MOTOR WITH FIRST AND SECOND COILS HAVING FIRST AND SECOND COIL BUNDLES OF DIFFERENT INNERMOST PERIPHERAL LENGTH

(75) Inventors: Hideyuki Tanimoto, Hitachinaka (JP); Teruo Imai, Hitachinaka (JP); Kenji Niwa, Hitachinaka (JP); Tomoyoshi Yokota, Hitachinaka (JP)

(73) Assignee: Hitachi Koki Co., Ltd., Tokyo (JP)

( * ) Notice: Subject to any disclaimer, the term of this patent is extended or adjusted under 35 U.S.C. 154(b) by 235 days.

(21) Appl. No.: 11/048,800

(22) Filed: Feb. 3, 2005

(65) Prior Publication Data

US 2005/0168095 A1 Aug. 4, 2005

(30) Foreign Application Priority Data

Feb. 3, 2004 (JP) .......................... P2004-026379

(51) Int. Cl.
*H02K 3/00* (2006.01)
*H02K 9/00* (2006.01)

(52) U.S. Cl. .................. 310/179; 310/58; 310/184; 310/208

(58) Field of Classification Search .......... 310/179, 310/180, 184, 198, 208, 58, 59, 77, 93; 318/375
See application file for complete search history.

(56) References Cited

U.S. PATENT DOCUMENTS

| | | | |
|---|---|---|---|
| 2,729,758 A * | 1/1956 | Knapp .......................... | 310/59 |
| 3,333,329 A * | 8/1967 | Linkous ....................... | 29/596 |
| 5,063,319 A | 11/1991 | Mason et al. | |
| 5,677,586 A * | 10/1997 | Horst .......................... | 310/103 |
| 6,011,339 A * | 1/2000 | Kawakami .................. | 310/208 |
| 6,013,964 A * | 1/2000 | Meyer ......................... | 310/184 |
| 6,555,938 B2 | 4/2003 | Yokota ......................... | 310/71 |
| 2004/0007931 A1* | 1/2004 | Gorohata et al. ............ | 310/180 |
| 2005/0168095 A1* | 8/2005 | Tanimoto et al. ............ | 310/208 |

FOREIGN PATENT DOCUMENTS

DE 1563005 5/1970

(Continued)

OTHER PUBLICATIONS

Translation of DE 36 434 22 A1 "Hand Tool With Electric Motor", Schuster et al., Jun. 30, 1988.*

(Continued)

*Primary Examiner*—Karl I Tamai
(74) *Attorney, Agent, or Firm*—Antonelli, Terry, Stout & Kraus, LLP.

(57) ABSTRACT

A first coil includes a first inner-coil bundle and a first outer-coil bundle. The first outer-coil bundle is positioned radially outwardly of the first inner-coil bundle in a radial direction of a stator core. A second coil includes a second inner-coil bundle and a second outer-coil bundle. The second outer-coil bundle is positioned radially outwardly of the second inner-coil bundle. A first inner-coil end and a first outer-coil end form a gap and a groove. A second inner-coil end and a second outer-coil end also form a gap and a groove.

15 Claims, 12 Drawing Sheets

FOREIGN PATENT DOCUMENTS

| | | | |
|---|---|---|---|
| DE | 3643422 | * | 6/1988 |
| JP | 53-133701 | * | 11/1978 |
| JP | 56-166742 | | 12/1981 |
| JP | 61-052140 | | 3/1986 |
| JP | 62-89459 | | 4/1987 |
| JP | 11-300656 | | 11/1999 |
| JP | 2001-292544 | | 10/2001 |

OTHER PUBLICATIONS

Bala, C., Fetita, Al., Lefter, V.: Handbuch der Wickeltechnik elektrischer Maschinen. 2. Aufl. Berline, Verlag Technik, 1976, S. 346-347.

* cited by examiner

ELECTRIC TOOL HAVING ELECTRIC MOTOR WITH FIRST AND SECOND COILS HAVING FIRST AND SECOND COIL BUNDLES OF DIFFERENT INNERMOST PERIPHERAL LENGTH

BACKGROUND OF THE INVENTION

1. Field of the Invention

The present invention relates to an electric motor having two coil bundles, and to an electric tool provided with such an electric motor. The present invention also relates to a method for producing the electric motor.

2. Description of Related Art

Electric Motors used for electric tools have been proposed for improving the cooling efficiency of electric motors. For example, a first coil bundle and a second coil bundle are set onto a first coil winding part and a second coil winding part of a stator core, respectively. Then, a gap is provided at roughly the center of the coil end of the first coil in a radial direction of the rotor. The gap extending in the circumferential direction of the rotor is formed by moving a part of the first coil toward the rotor. Such arrangement is disclosed in Japanese patent application publications No. 2001-292544. Thus, cooling efficiency of the motor can be improved.

However, with conventional electric motors, since movable distance of the part of the first coil toward the rotor is insufficient, only a tiny gap can be created. Accordingly, the air from the fan does not flow easily, so an improvement in cooling efficiency of the motor was not realized. Further, in order to enhance cooling efficiency, the coil end part of the bundle is preferably manually divided into two bundles having number of coil turns equal to each other in order to provide the gap between the divided two bundles. However, significant cost and production time have been required in order to count the number of coil turns and form the gap after setting the coil bundle.

SUMMARY OF THE INVENTION

It is therefore, an object of the present invention to provide an improved electric motor that can significantly improve cooling efficiency, and to provide an electric tool having such motor.

Another object of the invention is to provide a method for providing the electric motor capable of facilitating formation of the gap.

In order to attain the above and other objects, the present invention provides an electric tool including a housing, a stator core, a first coil, a second coil, a rotor, and a fan. The housing is formed with an air inlet duct and an air exhaust duct. The stator core is fixed within the housing, and includes at least a first coil winding part and a second coil winding part opposing the first coil winding part, and is formed with a center bore. The first coil is wound on the first coil winding part. The second coil is wound on the second coil winding part, and positioned opposite to the first coil. The rotor is rotatably disposed in the center bore and between the first coil and the second coil. The fan is placed within the housing for taking air from the air inlet duct in the housing and discharging air through the exhaust duct to cool the first coil and the second coil. The first coil and the second coil respectively include a pair of axial winding portions respectively running in an axial direction of the rotor and a pair of circumferential winding portions projecting outward from an axial ends of the stator core while running along a circumferential direction of the rotor. The first coil and second coil respectively include at least a first coil bundle and a second coil bundle, and at least one of a gap and a groove is formed by the first coil bundle and the second coil bundle in at least one of the circumferential winding portions.

In another aspect of the invention, there is provided a motor including the stator core, the first coil, the second coil, and the rotor.

In another aspect of the invention, there is provided a method for producing an electric motor including a first producing step, a second producing step, a forming step, and a setting step. In the first producing step, two first coil bundles having a pair of axial winding equivalents and a pair of circumferential winding equivalents, and two second coil bundles having a pair of axial winding equivalents and a pair of circumferential winding equivalents are produced. The first coil bundles and the second coil bundle have predetermined number of turns. In the second producing step, a first coil is produced by positioning the pair of axial winding equivalents of one of the first coil bundles and the pair of axial winding equivalents of one of the second coil bundles adjacent to each other in an overlapping fashion. Further, a second coil is produced by positioning the pair of axial winding equivalents of remaining one of the first coil bundles and the pair of axial winding equivalents of remaining one of the second coil bundles adjacent to each other in an overlapping fashion. In the forming step, at least one of a gap and a groove is formed in the first coil and the second coil and between at least one of the circumferential winding equivalents of the first coil bundles and the circumferential winding equivalent of the second coil bundles which opposes the at least one of the circumferential winding equivalents. In the setting step, the first coil and the second coil are set onto a first coil winding part and a second coil winding part of a stator core, respectively.

In another aspect of the invention, there is provided a method for producing an electric motor including a first producing step, a second producing step, a setting step, and a forming step. In the first producing step, two first coil bundles are produced in which the coils are wound a specific number of turns, and two second coil bundles are produced in which the coils are wound a specific number of turns. In the second producing step, a first coil is produced by adjacently positioning one of the first coil bundles and one of the second coil bundles, and a second coil is produced by adjacently positioning remaining one of the first coil bundles and remaining one of the second coil bundles. In the setting step, the first coil is set onto a first coil winding part of a stator core to provide a pair of axial winding portions and a pair of circumferential winding portions projecting outward from axial ends of the stator core, and the second coil is set onto a second coil winding part of the stator core to provide a pair of axial winding portions and a pair of circumferential winding portions projecting outward from axial ends of the stator core. In the forming step, at least one of a gap and a groove is formed between at least one of the circumferential winding portions in the first coil and the second coil.

BRIEF DESCRIPTION OF THE DRAWINGS

The above and other objects, features and advantages of the invention will become more apparent from reading the following description of the preferred embodiments taken in connection with the accompanying drawings in which.

DETAILED DESCRIPTION OF THE PREFERRED EMBODIMENTS

Figure 1:
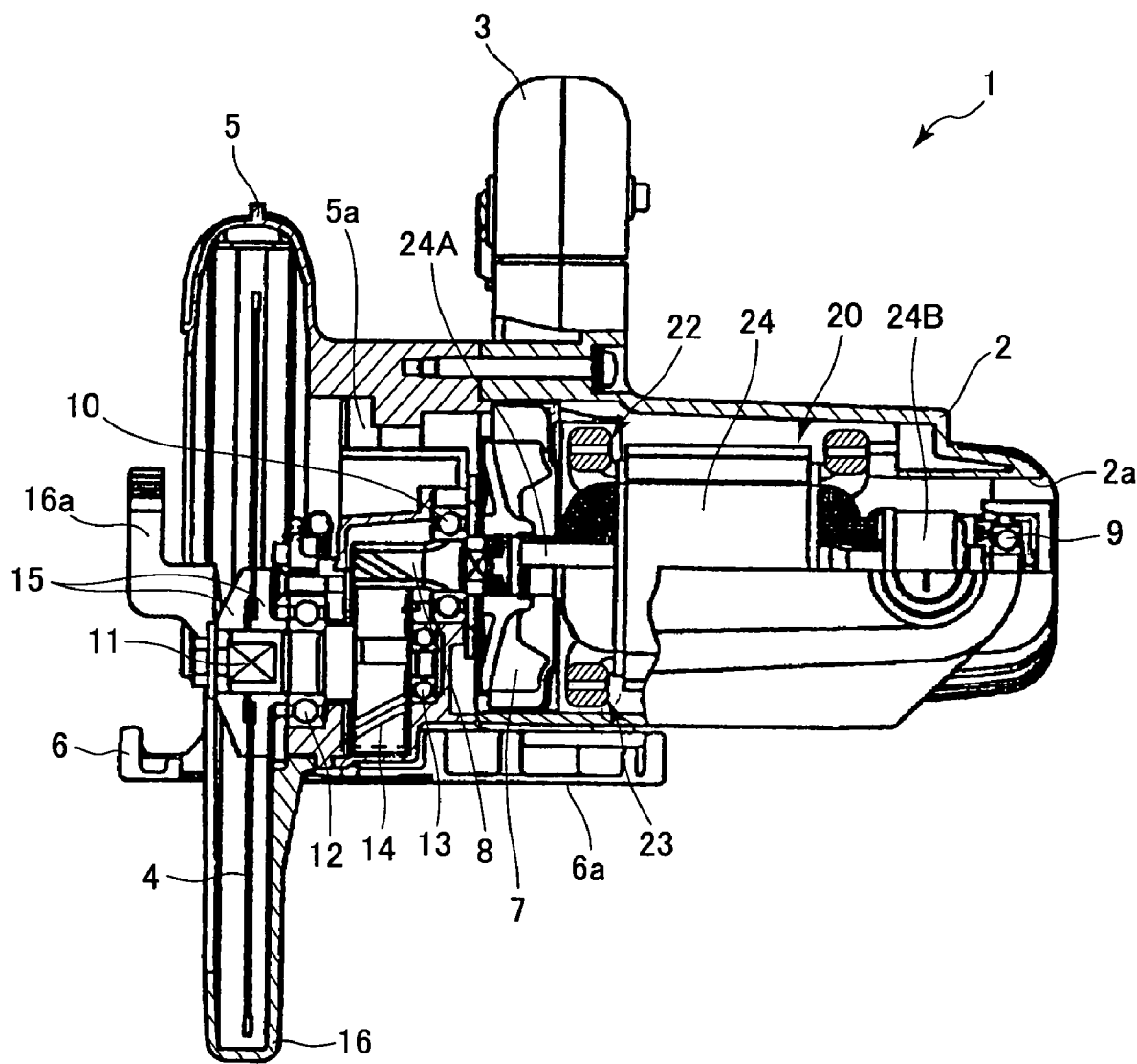
FIG. 1 is a partial cross-sectional view showing a portable electric circular saw according to a first embodiment of the present invention.

A motor for a electric tool according to preferred embodiments of the present invention will be described while referring to the accompanying drawings wherein like parts and components are designated by the same reference numerals to avoid duplicating description. The electric tool of the present invention is applied to a portable electric circular saw.

First Embodiment

A motor for a portable electric circular saw 1 according to a first embodiment of the present invention will be described with reference to FIGS. 1 through 3(b). As shown in FIG. 1, a portable electric circular saw 1 includes a housing 2 which internally supports and houses a motor 20, a handle 3, a saw blade 4, a saw cover 5, a base 6, and a fan 7. An air inlet duct 2a which connects the interior and exterior of the housing 2 is formed on one end of the housing 2. The handle 3 is provided integrally with the housing 2 or linked to the housing 2 as a separate member. A switch (not shown) is provided to control the drive of the motor 20. The saw blade 4 is rotatable in only a normal rotation direction which can be cut a workpiece. The saw cover 5 is mounted to the housing 2, and is shaped so as to cover the upper half of the periphery of the saw blade 4. A fan airflow vent 5a is formed on the saw cover to discharge the fan airflow (not shown). The base 6 is connected to the housing 2 via the saw cover 5 and has a bottom surface 6a that slides on the workpiece. The base 6 is formed with an opening (not shown) through which the saw blade 4 is projected downward beyond the bottom surface 6a. The motor 20 has a first coil 22 and a second coil 23. The fan 7 is fixed to an output shaft 24A (described later) to cool the first coil 22 and the second coil 23.

A pinion gear 8 is disposed at an end of the output shaft 24A. The output shaft 24A and the pinion gear 8 are rotatably supported by first bearings 9 and 10. The first bearings 9 and 10 are provided on the air inlet duct 2a side of the housing 2 and on the saw cover 5, respectively. A drive shaft 11 extending parallel to the output shaft 24A is rotatably supported by second bearings 12 and 13 within the saw cover 5. The drive shaft 11 extends through the saw cover 5, and a gear 14 is coaxially fixed to the drive shaft 11. The gear 14 is in a meshing engagement with a pinion gear 8. A pair of saw blade locking members 15 are attached to the drive shaft 11. The saw blade locking members 15 are not rotatable relative to the drive shaft 11 and pinch the saw blade 4 therebetween.

The portable electric circular saw 1 further includes a safety cover 16 pivotably supported by the drive shaft 11. The safety cover 16 is adapted to cover substantially a lower half of the outer periphery of the saw blade 4 and can be retracted into the saw cover 5. The safety cover 16 has a lever 16a for manual pivotal movement operations. The safety cover 16 is urged by an urging member (not shown), such as a spring. FIG. 1 shows the initial state of the safety cover 16, where the most part of the safety cover 16 projects downward beyond the bottom surface 6a of the base 6 so as to prevent the outer periphery of the saw blade 4 from being exposed. When a cutting operation is conducted, the front end of the safety cover 16 abuts the rear end of the workpiece. As the user slides the portable electric circular saw on the workpiece in the cutting direction, the safety cover 16 is pivotably moved about the drive shaft 11 and enters the saw cover 5 against the urging force of the urging member, exposing the saw blade 4 at the bottom surface 6a of the base 6. If cutting is not started from the rear end of the workpiece, but is started within a desired area of the workpiece, for example, formation of a window is to be performed, the user can manually move the safety cover 16 by operating the lever 16a to expose the saw blade 4 at the bottom surface 6a of the base 6.

Figure 2:
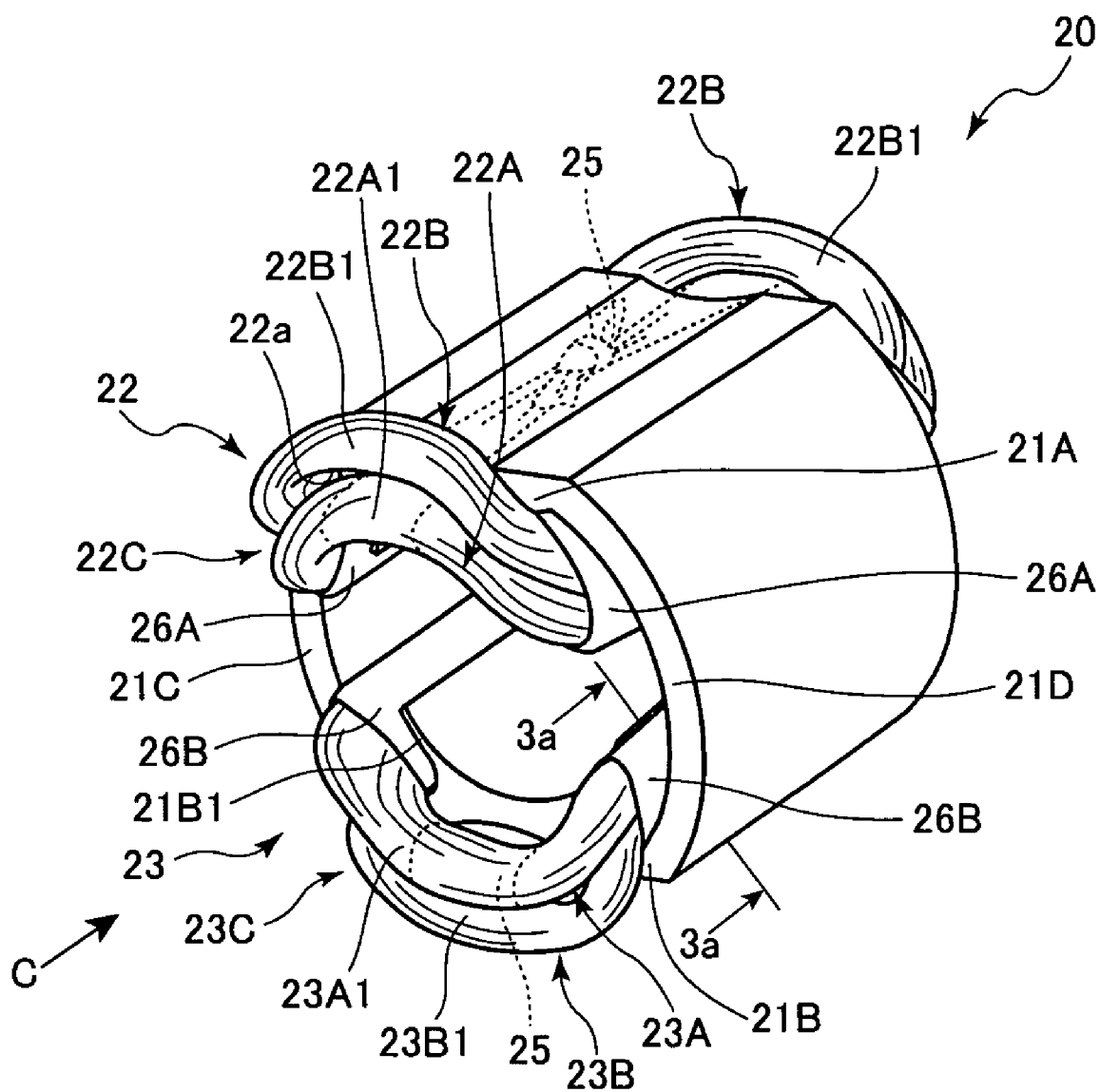
FIG. 2 is a perspective view of an electric motor in the first embodiment.

Next, the motor 20 will be described with reference to FIG. 2 through FIG. 3(c). The motor 20 has a stator core 21, the first coil 22, the second coil 23, and a rotor 24 (FIG. 1). The stator core 21 is supported by the housing 2, is formed with a center bore 21a into which the rotor 24 is loosely inserted. The center bore 21a extends in the axial direction of the rotor 24. In addition, the stator core 21 has a first coil winding part 21A, a second coil winding part 21B, a first connection part 21C, and a second connection part 21D. The second coil winding part 21B opposes the first coil winding part 21A. The first connection part 21C joins one end of the first coil winding part 21A and one end of the second coil winding part 21B. The second connection part 21D joins the remaining end of the first coil winding part 21A and the remaining end of the second coil winding part 21B.

Figure 3A:
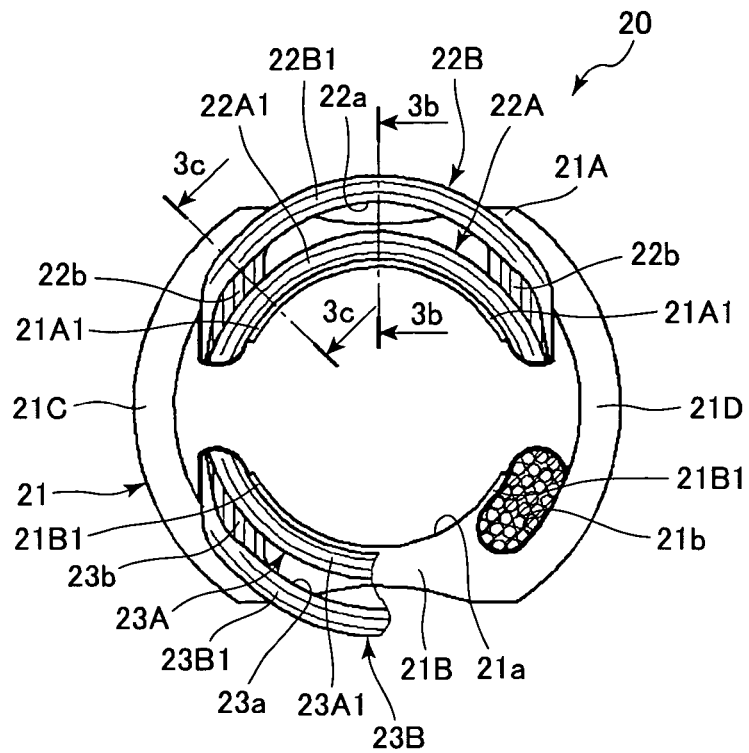
FIG. 3(a) is a front view of a stator core of the motor in the first embodiment as viewed in a direction C in FIG. 2 and shows a vertical cross-section of a portion of the stator core taken along a line 3a-3a in FIG. 2.

Part of outer periphery of the first coil winding part 21A is curved so as to sink radially-inwardly. A first coil retainer strip 21A1 is provided on the inner periphery of the first coil winding part 21A. The first coil retainer strip 21A1 consists of part of a pair of first stator slots (not shown and described later). The first coil retainer strip 21A1 extends roughly parallel to the extending direction of the first connection part 21C and the second connection part 21D along the outer periphery of the rotor 24. In addition, the first stator slots (not shown) for retaining the first coil 22 are defined by the first connection part 21C and the first coil retainer strip 21A1, and by the second connection part 21D and the first coil retainer strip 21A1. Further, the second coil winding part 21B has the same shape as the first coil winding part 21A, and a second coil retainer strip 21B1 is provided which correspond to first coil retainer strip 21A1. In addition, a pair of second stator slots 21b (only one of each is shown in FIG. 3(a)) corresponding to the first stator slots (not shown) of the first coil winding part 21A are defined on the second coil winding part 21B to retain the second coil 23.

The first coil 22 is wound on the first coil winding part 21A and retained by the first stator slots. The second coil 23 is wound on the second coil winding 21B and retained by the second stator slots 21b. The first coil 22 includes a pair of first coil ends 22C, and a pair of first axial coils 22D (FIG. 3(c)). The second coil 23 includes a pair of second coil ends 23C, and a pair of second axial coils (not shown). The pairs of first and second coil ends 22C and 23C project outward from the both axial ends of the stator core 21, and are roughly arc-shaped along the periphery of the rotor 24, respectively. The pairs of first and second axial coils 22D extend inside the stator core 21 in the axial direction of the rotor 24, respectively. The first coil 22 and the second coil 23 form a roughly square shape by the first and second coil ends 22C and 23C, and the first and second axial coils 22D, respectively.

The motor 20 further includes pairs of inulting papers 26A and 26B. The pair of insulating papers 26A is wound over the first axial coils 22D, respectively. The pair of insulating papers 26B is wound to cover the second axial coils, respectively. The insulating papers 26A, 26B are adapted to provide insulation of the axial coil 22D from stator core 21.

The first coil 22 includes a first inner-coil bundle 22A, and a first outer-coil bundle 22B. The first outer-coil bundle 22B is positioned outward of the first inner-coil bundle 22A in a radial direction of the stator core 21. The second coil 23 includes a second inner-coil bundle 23A, and a second outer-coil bundle 23B. The second outer-coil bundle 23B is positioned outward of the second outer-coil bundle 23A in a radial direction of the stator core 21.

The first inner-coil bundle 22A includes a pair of first inner-coil ends 22A1 and a pair of first axial inner-coils (not shown). The first outer-coil bundle 22B includes a pair of first outer-coil ends 22B1 and a pair of first axial outer-coils (not shown). The second inner-coil bundle 23A includes a pair of second inner-coil ends 23A1 and a pair of second axial inner-coils (not shown). The second outer-coil bundle 23B includes a pair of second outer-coil ends 23B1 and a pair of second axial outer-coils (not shown).

The first coil end 22C is made up of the first inner-coil end 22A1, and the first outer-coil end 22B1. The first axial coil 22D is made up of the first axial inner-coil and the first axial outer-coil. The second coil end 23C is made up of the second inner-coil end 23A1, and the second outer-coil end 23B1. The second axial coil is made up of the second axial inner-coil and the second axial outer-coil.

The first inner-coil bundle 22A includes a main coil and a brake coil. The main coil generates a magnetic field to rotate the rotor 24. The brake coil is positioned in contact with the innermost periphery of the main coil and generates a magnetic field to impart braking force on the rotation of the rotor 24. The first outer-coil bundle 22B includes the same main coil as the main coil of the first inner-coil bundle 22A. The innermost peripheral length of the first outer-coil bundle 22B is configured so as to be longer than that of the first inner-coil bundle 22A. In addition, the main coil of the first inner-coil bundle 22A and the main coil of the first outer-coil bundle 22B are electrically connected, and the number of turns of the first inner-coil bundle 22A is roughly the same as that of the first outer-coil bundle 22B. The second inner-coil bundle 23A has the same structure the first inner-coil bundle 22A, and the second outer-coil bundle 23B has the same structure as the first outer-coil bundle 22B. The main coil of the second inner-coil bundle 23A and the main coil of the second outer-coil bundle 23B are electrically connected, and the number of turns is roughly the same for both.

In addition, a band 25 (FIG. 2) is wound at the roughly center in the circumferential direction of the pair of first inner-coil ends 22A1 so that the pair of first inner-coil ends 22A1 are moved toward each other in the axial direction of the stator core 21. The band 25 prevents deformation of the first outer-coil ends 22B1 in the direction to the rotor 24 due to the heat generated by the electric current flowing through the coils. The same band 25 is wound roughly at the center in the circumferential direction of the pair of second inner-coil ends 23A1 as well. In FIG. 3, the band 25 is omitted in order to simplify the illustration.

Next, the relative positions of the first inner and outer-coil ends 22A1 and 22B1, and the second inner and outer-coil ends 23A1 and 23B1 will be described. As shown in FIGS. 3(a) and (b), the first inner-coil end 22A1 and the first outer-coil end 22B1 form a gap 22a in the area separated from the first stator slot when viewed the first inner-coil end 22A1 and the first outer-coil end 22B1 from the axial direction of the rotor 24. Furthermore, the gap 22a is formed such that, when viewed the gap 22a from the axial direction of the rotor 24, the gap 22a encompasses a part of the outer edge of the stator core 21. The first inner-coil end 22A1 and the first outer-coil end 22B1 further form a groove 22b in the area corresponding to the first stator slot when viewed the first inner-coil end 22A1 and the first outer-coil end 22B1 from the axial direction of the rotor 24.

Figure 3B:
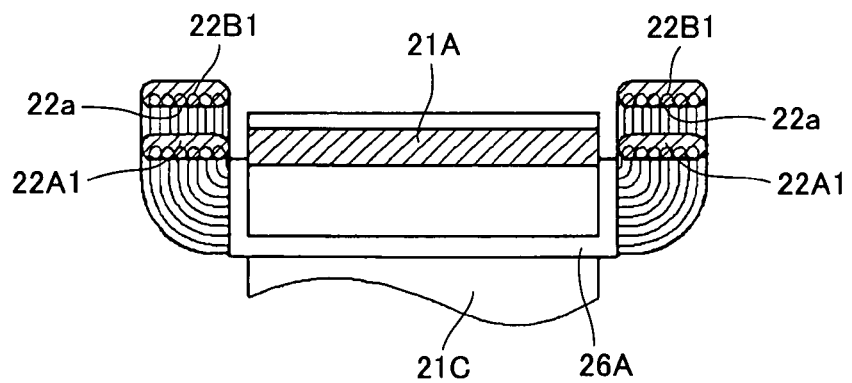
FIG. 3(b) is a cross-sectional view taken along a line 3b-3b in FIG. 3(a)
Figure 3C:
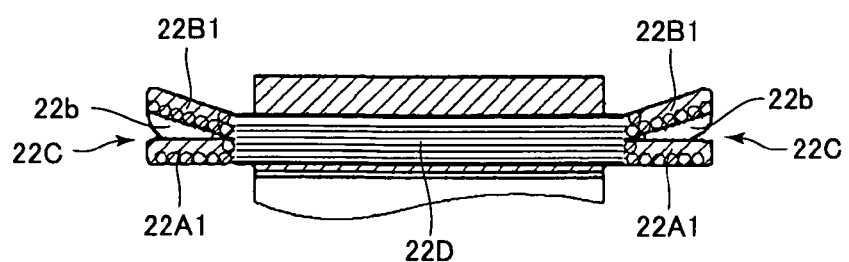
FIG. 3(c) is a cross-sectional view taken along a line 3c-3c in FIG. 3(a)

As shown in FIG. 3(c), the groove 22b is composed of a first wall and a second wall. The first wall is composed of the peripheral surface of the part of the coil which constitutes the first inner-coil end 22A1, and the second wall is composed of the peripheral surface of the part of the coil which constitutes the first outer-coil end 22B1. A distance between the first wall and second wall is gradually increased toward outermost surface of the coil end 22C. As described above, the innermost peripheral length of the first outer-coil bundle 22B is longer than that of the first inner-coil bundle 22A, and thus the gap 22a and the groove 22b can be easily formed. The second inner-coil end 23A1 and the second outer-coil end 23B1 form a gap 23a and a groove 23b. The gap 23a and the groove 23b are the same as those of the gap 22a and the groove 22b formed by the first inner-coil end 22A1 and the first outer-coil end 22B1.

As shown in FIGS. 3(a) and (b), the cross-sectional shape of the first inner and outer-coil ends 22A1 and 22B1, and the second inner and outer-coil ends 23A1 and 23B1 are roughly depressed or planar shape. Moreover, the rotor 24 is loosely inserted into the center bore 21a. Multiple coils are arranged inside the rotor 24 to flow electric current along the axial direction of the rotor 24. In addition, a commutator 24B (FIG. 1) is provided on the end of the rotor 24 on the side of the air inlet duct 2a to flow electric current in a predetermined direction through the coils of the rotor 24 when the rotator 24 is rotated at a specific rotational position.

When the switch (not shown) is turned ON, electric current flows from a power supply (not shown) into the respective main coils of the first inner and outer-coil ends 22A1 and 22B1 and the second inner and outer-coil ends 23A1 and 23B1, and into the coil of the rotor 24. As a result, a magnetic field is generated between the first coil 22 and the second coil 23. A force to rotate the rotor 24 is generated by the magnetic field and the electric current flowing in the coil of the rotor 24, thereby rotating the rotor 24. The output shaft 24A also rotates by the rotation of the rotor 24, and the rotational force of the output shaft 24A is transmitted to the saw blade 4 through the pinion gear 8, the gear 14, the drive shaft 11, and the saw blade locking members 15. Thus, the saw blade 4 rotates in the direction of normal rotation, thereby enabling cutting operation.

When the switch (not shown) is turned OFF after the cutting operation, the electric current flows through the coils of the rotor 24 by the inertial rotation of the rotor 24 and a residual magnetic field, and a magnetic field is generated by the brake coil of the first inner-coil bundle 22A and the brake coil of the second inner-coil bundle 23A. As a result, a force (braking action) is generated in a direction opposite to the force generated upon turning ON the switch (not shown), and the rotation of the saw blade 4 is stopped. In this manner, the rotation of the saw blade 4 can be stopped at short times after cutting operation by providing a brake coil, and thus operation safety of the electric circular saw 1 is improved for the user. In addition, when the output shaft 24A rotates during the cutting operation, the fan 7 also rotates. Air (fan airflow) flows from the air inlet duct 2a into the housing 2 by rotating the fan 7. The fan airflow cools the first coil 22 and the second coil 23 which generate heat due to the electric current flowing therethrough. Moreover, the fan airflow flows in the radial direction of the fan 7 and in the axial direction of the rotor 24, and is discharged out of the fan airflow vent 5a.

The first coil ends 22C, and the second coil ends 23C function as heat release portions at which cooling effect is most expected. The first coil ends 22C include the first inner-coil end 22A1 and the first outer-coil end 22B1. The second coil ends 23C include the second inner-coil end 23A1 and the second outer-coil end 23B1. Additionally, the first inner-coil end 22A1 and the first outer-coil end 22B1 form the gap 22a and the groove 22b. The second inner-coil end 23A1 and the second outer-coil end 23B1 form the gap 23a and the groove 23b. Thus, a heat release area of the first coil ends 22C and the second coil ends 23C is significantly increased in comparison with that of conventional motors. The cross-sectional shape of the first inner and outer-coil ends 22A1 and 22B1, and the second inner and outer-coil ends 23A1 and 23B1 are roughly depressed or planar shape, so the heat release area can be increased even further. Moreover, the first inner-coil bundle 22A, the first outer-coil bundle 22B, the second inner-coil bundle 23A, and the second outer-coil bundle 23B are provided with main coils which have roughly the same number of turns.

Consequently, the first inner-coil bundle 22A, the first outer-coil bundle 22B, the second inner-coil bundle 23A, and the second outer-coil bundle 23B can be evenly cooled. The gap 22a is formed such that, when viewed from the axial direction of the rotor 24, the gap 22a encompasses the part of the outer edge of the stator core 21, so the fan airflow readily strikes each coil ends 22A1, 22B1, 23A1, and 23B1. In the above manner, the cooling efficiency of the fan airflow is significantly increased. Thus, increase in temperature of the first coil 22 and the second coil 23 are restrained, and prolonged service life of the motor 20 can result. Moreover, high load can be applied to the motor 20 during cutting operation.

Figure 4A:
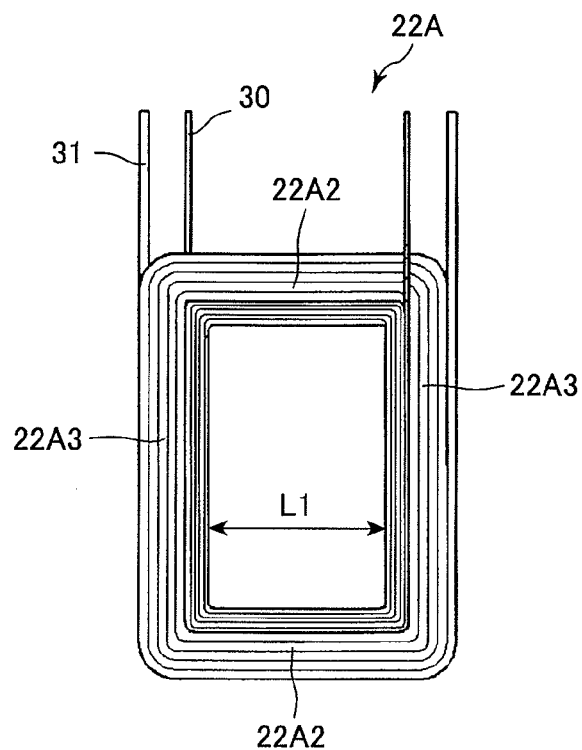
FIG. 4(a) is a plan view of a first inner-coil bundle in the motor production process for the first embodiment.
Figure 4B:
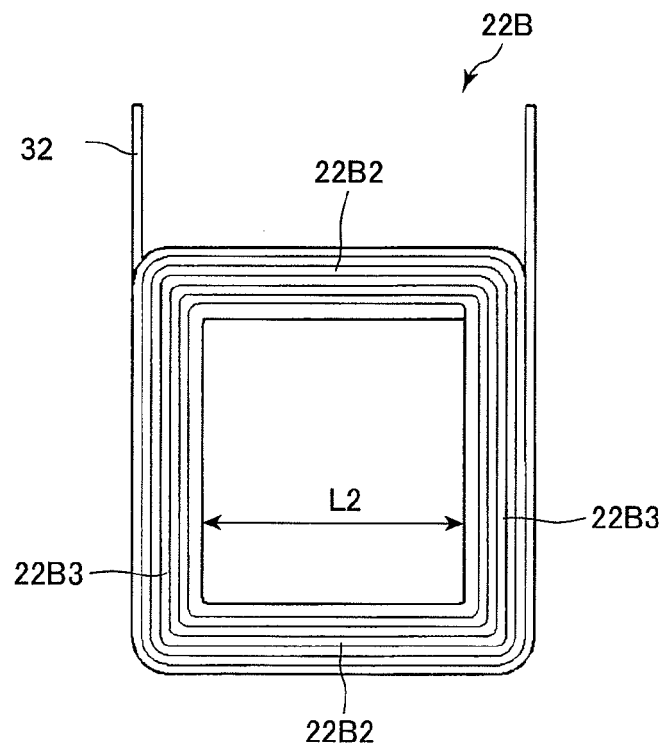
FIG. 4(b) is a plan view of a first outer-coil bundle in the motor production process for the first embodiment.

Next, a method of producing the motor 20 in the first embodiment will be described with reference to FIGS. 4(a) through 5(b). As shown in FIG. 4(a), a first magnet wire 30 which will function as a brake coil is wound with a specific number of turns. A second magnet wire 31 which will function as a main coil is wound with a specific number of turns on the outermost periphery of the first magnet wire 30. The first inner-coil bundle 22A having a pair of first inner-coil end equivalents 22A2 (circumferential winding equivalents) and a pair of first axial inner-coil equivalents 22A3, is produced. As shown in FIG. 4(b), a third magnet wire 32 which will function as a main coil is wound with a specific number of turns. The first outer-coil bundle 22B having a pair of first outer-coil end equivalents 22B2 (circumferential winding equivalents) and a pair of first axial outer-coil equivalents 22B3, is produced. The main coil of the first inner-coil bundle 22A and the main coil of the first outer-coil bundle 22B are connected to each other with solder, and moreover, both main coils have roughly the same number of turns.

The first inner-coil bundle 22A and the first outer-coil bundle 22B are wound such that innermost peripheral distance L1 between the pair of first axial inner-coil equivalents 22A3, 22A3 is shorter than the innermost peripheral distance L2 between the pair of first axial outer-coil equivalents 22B3, 22B3. The first inner-coil bundle 22A and the first outer-coil bundle 22B are also wound such that the innermost peripheral distance between the pair of first inner-coil end equivalents 22A2, 22A2 is roughly equal to the innermost peripheral distance between the pair of first outer-coil end equivalents 22B2, 22B2. The first inner-coil bundle 22A is also wound such that the innermost peripheral distance L1 of the first inner-coil bundle 22A is roughly equal to the distance along the circumferential direction between the deepest portions of the pair of first stator slots (not shown).

In addition, a second inner-coil bundle 23A (FIG. 2) is produced same as the first inner-coil bundle 22A, and a second outer-coil bundle 23B (FIG. 2) is produced same as the first outer-coil bundle 22B. Accordingly, the second inner-coil bundle 23A includes a pair of second inner-coil end equivalents (circumferential winding equivalents) and a pair of first axial inner-coil equivalents. The second outer-coil bundle 23B includes a pair of second outer-coil end equivalents (circumferential winding equivalents) and a pair of second axial outer-coil equivalents.

Figure 4C:
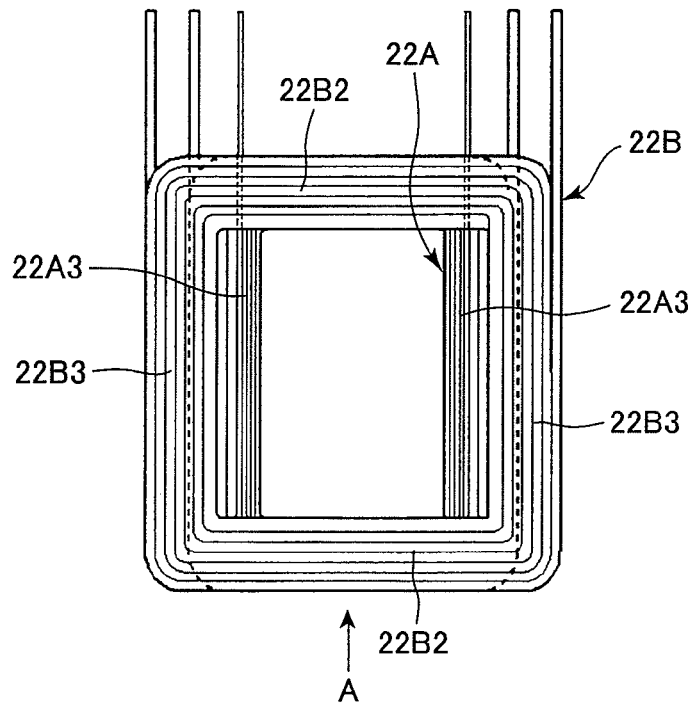
FIG. 4(c) is a plan view of the first inner-coil bundle and first outer-coil bundle in the motor production process for the first embodiment when located adjacently so as to overlap.
Figure 5A:
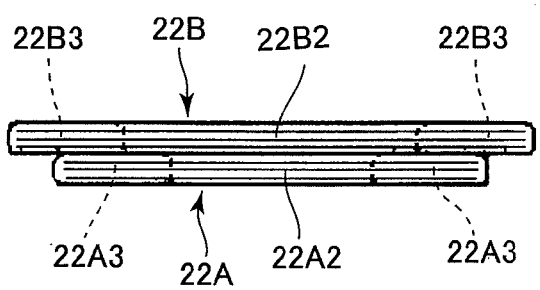
FIG. 5(a) is a view of the first inner-coil bundle and first outer-coil bundle located adjacently as viewed from a direction A in FIG. 4(c)

Next, as shown in FIG. 4(c), the pair of first axial inner-coil equivalents 22A3 and the pair of first axial outer-coil equivalents 22B3 are located adjacently so as to overlap. This adjacent overlapping location is performed for the second inner-coil bundle 23A and second outer-coil bundle 23B as well. FIG. 5(a) is an illustration of the adjacently located first inner-coil bundle 22A and first outer-coil bundle 22B when viewed from a direction A of FIG. 4(c).

Figure 5B:
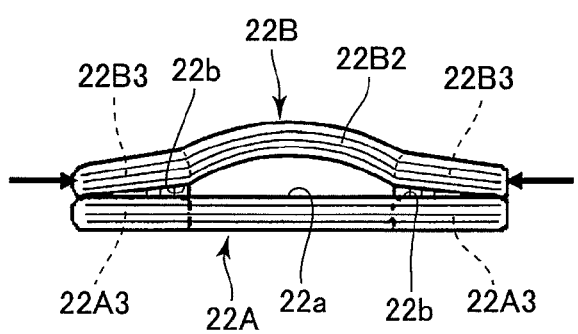
FIG. 5(b) is a view showing a state in which a pair of first axial outer-coil equivalents of the first outer-coil bundle are moved toward each other, so that an innermost peripheral surface of the bundle is brought into alignment with an, innermost peripheral surface of the first inner-coil bundle.

Next, the first outer-coil bundle 22B is deformed from the condition shown in FIG. 5(a) to that shown in FIG. 5(b). That is, the pair of first axial outer-coil equivalents 22B3 are move toward each other, so that the innermost periphery of the pair of first axial outer-coil equivalents 22B3 is aligned with the innermost periphery of the pair of first axial inner-coil equivalents 22A3. At this time, since the innermost peripheral distance L2 of the first outer-coil bundle 22B is longer than the innermost peripheral distance L1 of the first inner-coil bundle 22A, a portion of the first outer-coil end equivalent 22B2 becomes a roughly circular shape, as shown in FIG. 5(b) due to the alignment. Further, the first inner-coil end equivalent 22A2 and the first outer-coil end equivalent 22B2 form the gap 22a in the area except the overlapping axial coils in FIG. 5(b). In addition, the first inner-coil end equivalent 22A2 and the first outer-coil end equivalent 22B2 form the groove 22b in the area where axial coils are overlapped with each other shown in FIG. 5(b). As described above, since the innermost peripheral distance L2 of the first outer-coil bundle 22B has been longer than the innermost peripheral distance L1 of the first inner-coil bundle 22A, the gap 22a and the groove 22b can be easily formed.

Next, the insulting paper 26A (FIG. 2) is wound over one of the first axial inner-coil equivalents 22A3 and the first axial outer-coil equivalents 22B3 adjacent thereto, and insulating paper 26A (FIG. 2) is wound in the same manner over the other first axial inner-coil equivalent 22A3 and the first axial outer-coil equivalent 22B3 adjacent thereto. Consequently, the first inner-coil bundle 22A and the first outer-coil bundle 22B form a single unit, thus producing the first coil 22. The same process is carried out on the second inner-coil bundle 23A and the second outer-coil bundle 23B to produce the second coil 23.

Next, the first coil 22 is set to the first coil winding part 21A (FIG. 2) of the stator core 21, so that the first outer-coil bundle 22B is positioned on the outside in the radial direction of the stator core 21. While the second coil 23 is set to the second coil winding part 21B (FIG. 2) of the stator core 21 so that the second outer-coil bundle 23B is positioned on the outside in the radial direction of the stator core 21. In addition, a band 25 (FIG. 2) is wound on the roughly center in the circumferential direction of the pair of first inner-coil ends 22A1 such that the pair of first inner-coil ends 22A1 are moved toward each other in the axial direction of the stator core 21. A band 25 is wound on the roughly center in the circumferential direction of the pair of second inner-coil ends 23A1, thus producing the motor.

Second Embodiment

Next, a motor for a portable electric circular saw according to a second embodiment of the present invention will be described with reference to FIGS. 6(a), 6(b), and 6(c).

Figure 6A:
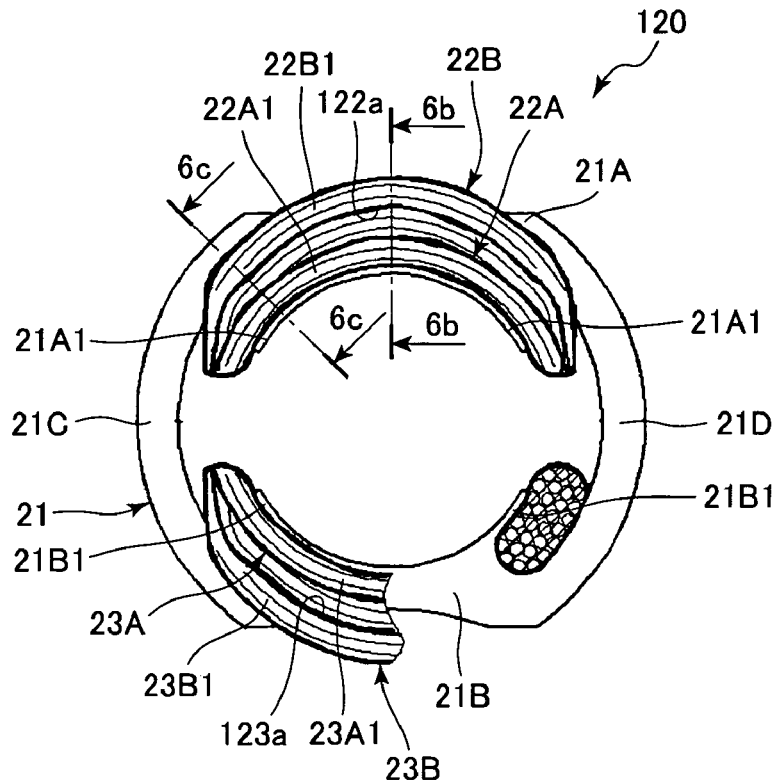
FIG. 6(a) is a front view of a stator core in a second embodiment as viewed in a direction C in FIG. 2 and shows a vertical cross-section of a portion of the stator core taken along a line 3a-3a in FIG. 2.
Figure 6B:
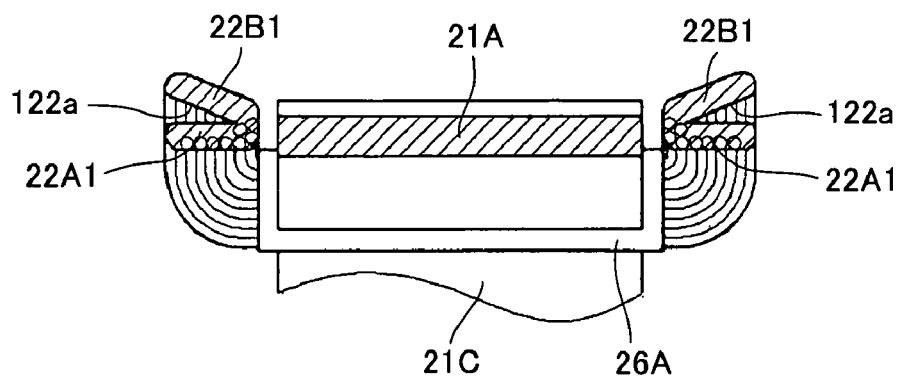
FIG. 6(b) is a cross-sectional view taken along a line 6b-6b in FIG. 6(a)
Figure 6C:
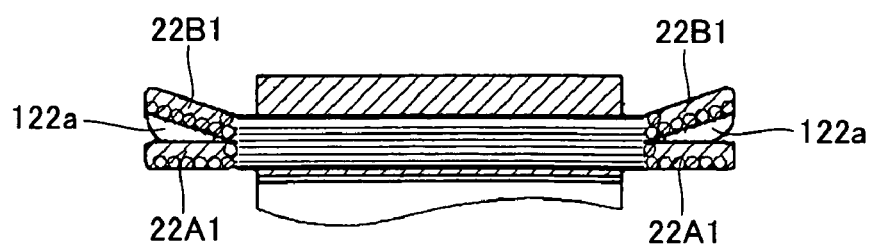
FIG. 6(c) is a cross-sectional view taken along a line 6c-6c in FIG. 6(a)

As shown in FIGS. 6(a), (b), and (c), in a motor 120 in the second embodiment, a first inner-coil end 22A1 and a first outer-coil end 22B1 form a groove 122a extending therebetween along entire length of the coil ends 22A1, 22B1 in the circumferential direction of the stator core 21. This groove 122a (FIG. 6(c)) is defined by a first wall and a second wall. The first wall is composed of the part of the coil of the first inner-coil end 22A1, and the second wall is composed of the part of the coil of the first outer-coil end 22B1. A distance between the first wall and second wall is gradually increased toward outermost surface of the coil ends 22A1, 22B1 in the axial direction of the stator core 21. Moreover, as in the first embodiment, the innermost peripheral length of the first outer-coil bundle 22B is configured to be longer than that of the first inner-coil bundle 22A, and thus the groove 122a can be easily formed.

A groove 123a corresponding to the grove 122a is formed by the second inner-coil end 23A1 and the second outer-coil end 23B1. Similar to the first embodiment, in the motor 120 in this embodiment, the cooling efficiency of the fan airflow is significantly increased. Therefore, increase in temperature in the coils can be restrained, and the service life of the motor 120 can be prolonged. Moreover, high load can be applied to the motor 120 during cutting operation.

Next, a method of producing the motor 120 in the second embodiment will be described. First, the motor 20 (FIG. 2) in the first embodiment is produced with the same production method as that described above. Next, the innermost periphery of the pair of first outer-coil ends 22B1 in FIG. 3(b) is twisted so as to come into contact with the innermost periphery of the first inner-coil end 22A1. Thus, a configuration shown in FIG. 6(b) is obtained. As a result, can be formed the groove 122a extending between the first inner-coil end 22A1 and the first outer-coil end 22B1 along entire length of the coil ends 22A1, 22B1 in the circumferential direction of the stator core 21. As described above, since the innermost peripheral length L2 of the second coil bundle 22B is configured to be longer than the innermost peripheral length L1 of the first coil bundle 22A, the groove 122a can be easily formed.

Third Embodiment

Next, a motor for a portable electric circular saw according to a third embodiment of the present invention will be described with reference to FIGS. 7(a) through 8(b).

Figure 7A:
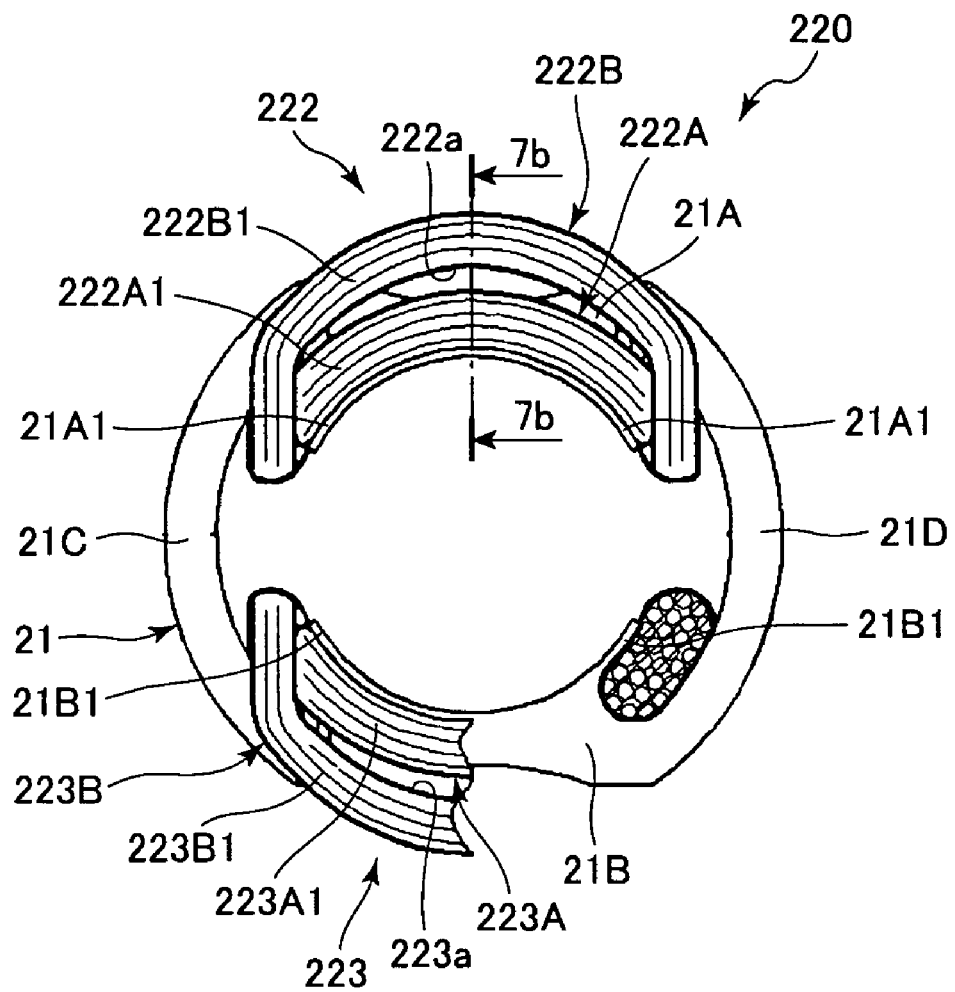
FIG. 7(a) is a front view of a stator core in a third embodiment as viewed in a direction C in FIG. 2 and shows a vertical cross-section of a portion of the stator core taken along a line 3a-3a in FIG. 2.

As shown in FIGS. 7(a) and (b), in the motor 220 in the third embodiment, first inner and outer-coil bundles 222A and 222B which correspond to the first inner and outer-coil bundles 22A and 22B in the first embodiment are respectively wound on the first coil winding part 21A. Second inner and outer-coil bundles 223A and 223B which correspond to the second inner and outer-coil bundles 23A and 23B in the first embodiment are respectively wound on the second coil winding part 21B. Further, similar to the first inner and outer-coil bundles 22A and 22B, the first inner and outer-coil bundles 222A and 222B are composed of respective pairs of first inner and outer-coil ends 222A1 and 222B1, and respective pairs of first axial inner- and outer-coils (not shown), and similar to the second inner and outer-coil bundles 23A and 23B, the second inner and outer-coil bundles 223A and 223B are composed of respective pairs of second inner and outer-coil ends 223A1 and 223B1, and respective pairs of second axial inner- and outer-coils (not shown).

The pair of first axial inner-coils is located inside of the pair of first axial outer-coils in the first stator slot in the circumferential direction of the stator core 21. Further, the innermost peripheral length of the first outer-coil bundle 222B is configured to be longer than that of the first inner-coil bundle 222A. The structures of the second inner-coil bundle 223A and the second outer-coil bundle 223B are the same as those of the first inner-coil bundle 222A and the first outer-coil bundle 222B, respectively.

Next, the relative positions of the first inner- and outer-coil ends 222A1 and 222B1, and the second inner- and outer-coil ends 223A1 and 223B1 will be described. As shown in FIGS. 7(a) and (b), the first inner-coil end 222A1 and the first outer-coil end 222B1 form a gap 222a therebetween in the area remote from the first stator slots in the axial direction of the rotor 24. Furthermore, the gap 222a is formed such that, when viewed from the axial direction of the rotor 24, the gap 222a encompasses part of the outer edge of the stator core 21. Similarly, the second inner-coil end 223A1 and the second outer-coil end 223B1 form a gap 223a therebetween. The gap 223a is the same as the gap 222a.

The innermost peripheral length of the second outer-coil bundle 222B is configured to be longer than that of the first inner-coil bundle 222A, and thus the gap 222a can be easily formed. The pair of first axial inner-coils is located inside of the pair of first axial outer-coils in the first stator slot. Therefore, the width of the gap 222a in the circumferential direction of the stator core 21 is greater than that of the gap 22a in the first embodiment. Similar to the first embodiment, according to the motor 220 the cooling efficiency of the fan airflow can be significantly increased. Thus, increase in temperature in the coils can be restrained, and the prolonged service life of the motor 220 can result. Moreover, high load can be applied to the motor 220 during cutting operation.

Figure 8A:
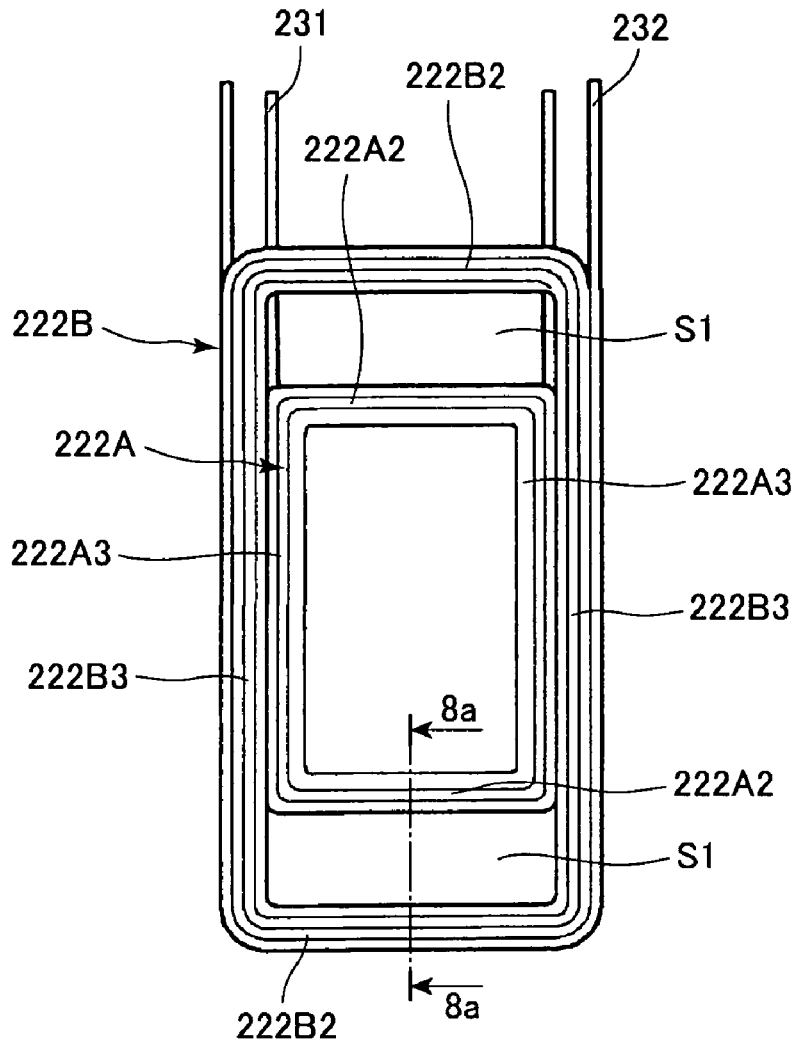
FIG. 8(a) is a plan view of a first inner-coil bundle in the motor production process for the third embodiment.
Figure 8B:
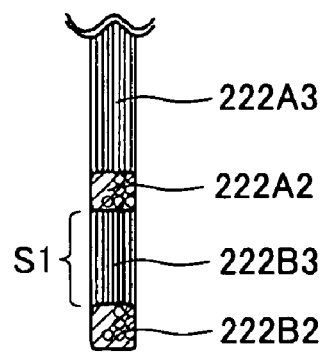
FIG. 8(b) is a cross-sectional view taken along a line 8a-8a in FIG. 8(a)

Next, a method of producing the motor 220 in the third embodiment will be described with reference to FIGS. 8(a) and (b). First, as shown in FIG. 8(a), a second magnet wire 231 which will function as a main coil is wound with a specific number of turns to produce a first inner-coil bundle 222A having a pair of first inner-coil end equivalents 222A2 (circumferential winding equivalents) and a pair of first axial inner-coil equivalents 222A3. Moreover, in this production method, the first inner-coil bundle 222A does not include the brake coil contrary to the first embodiment.

Next, a third magnet wire 232 which will function as a main coil is wound with a specific number of turns to produce the second coil bundle 222B having a pair of first outer-coil end equivalents 222B2 (circumferential winding equivalents) and a pair of first axial outer-coil equivalents 222B3. At this time, the first inner-coil bundle 222A and the second coil bundle 222B are wound such that outermost peripheral distance between the pair of first axial inner-coil equivalents 222A3 is equal to the innermost peripheral distance between the pair of first axial outer-coil equivalents 222B3, respectively. The first inner-coil bundle 222A and the second coil bundle 222B are also wound such that the outermost peripheral distance between the pair of first inner-coil end equivalents 222A2 is shorter than the innermost peripheral distance between the pair of first outer-coil end equivalents 222B2, respectively. The first inner-coil bundle 222A is also wound such that the innermost peripheral distance between the first axial inner-coil equivalents 222A3 of the first coil bundle 222A is roughly equal to the distance between the deepest portions of the pair of first stator slots (not shown) in the circumferential direction of the stator core 21. The main coil of the first inner-coil bundle 222A and the main coil of the first outer-coil bundle 222B are connected to each other with solder, and moreover, both have roughly the same number of turns.

In addition, a second inner-coil bundle 223A (FIG. 7) is produced in a manner the same as the first inner-coil bundle 222A, and a second outer-coil bundle 223B(FIG. 7) is produced in a manner the same as the first outer-coil bundle 222B. Accordingly, the second inner-coil bundle 223A includes a pair of second inner-coil end equivalents (circumferential winding equivalents) and a pair of second axial inner-coil equivalents. The second outer-coil bundle 223B includes a pair of second outer-coil end equivalents (circumferential winding equivalents) and a pair of second axial outer-coil equivalents.

Next, as shown in FIG. 8(a), the first inner-coil bundle 222A is inserted into a space defined by the innermost periphery of the first outer-coil bundle 222B at a roughly center between the pair of outer-coil end equivalents 222B2. Since the outermost peripheral distance between the pair of first inner-coil end equivalents 222A2 is shorter than the innermost peripheral distance between the pair of first outer-coil end equivalents 222B2, spaces S1 are formed between the outermost periphery of the pair of first coil end equivalents 222A2 and the innermost periphery of the pair of first outer-coil end equivalents 222B2 (see also FIG. 8(b)).

Next, insulating paper (not shown) is wound over one of the first axial inner-coil equivalents 222A3 and the first axial outer-coil equivalents 222B3 adjacent thereto, and another insulating paper (not shown) is wound in the same manner over the remaining first axial inner-coil equivalents 222A3 and the remaining first axial outer-coil equivalents 222B3 adjacent thereto as well. Consequently, the first inner-coil bundle 222A and the first outer-coil bundle 222B form a single unit, thus producing the first coil 222 (FIG. 7(a)). The second coil 223 (FIG. 7(b)) can be produced by the combination of the second inner-coil bundle 223A and the second outer-coil bundle 223B in a manner the same as the production of the first coil 222 as described above.

Figure 7B:
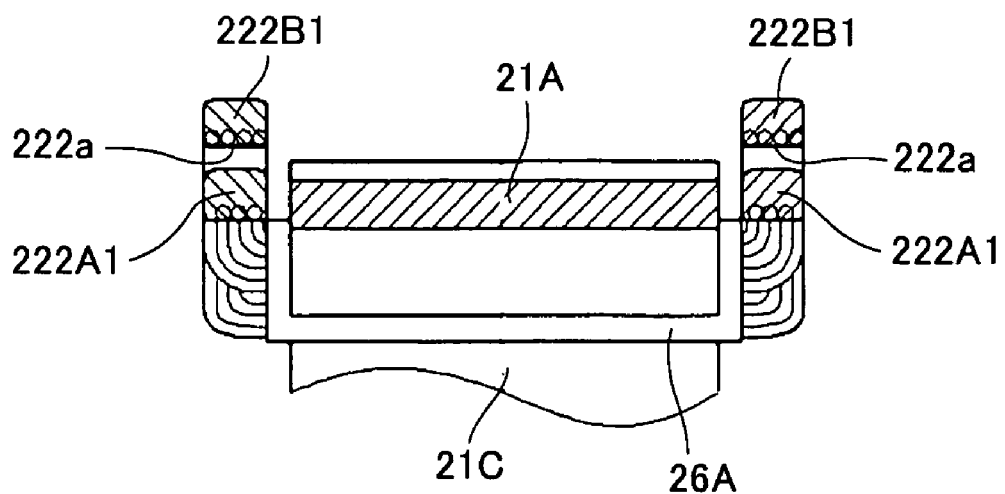
FIG. 7(b) is a cross-sectional view taken along a line 7b-7b in FIG. 7(a)

Next, the first coil 222 is set to the first coil winding part 21A (FIG. 7(a)) of the stator core 21 (FIG. 7(a)), and the second coil 223 is set to the second coil winding 21B (FIG. 7(a)) of the stator core 21. In addition, a band (not shown) is wound between the pair of first inner-coil ends 222A1 at the roughly center in the circumferential direction of the pair of first inner-coil ends 222A1 so that the pair of first inner-coil ends 222A1 are moved toward each other in the axial direction of the stator core 21. A band (not shown) is also wound between the pair of second inner-coil ends 223A1 on the roughly center in circumferential direction of the pair of the second inner-coil ends 223A1. Next, the first outer-coil end equivalents 222B are bent so as to overlap with first inner-coil end equivalents 222A2 in the radial direction of the stator core 21 as shown in FIG. 7(b). Thus, a gap 222a is formed between the first inner-coil end 222A1 and the first outer-coil end 222B1. In the second coil 223 as well, in the same manner a gap 223a is formed between the second inner-coil end 223A1 and the second outer-coil end 223B1. As described above, since the outermost peripheral distance between the pair of first inner-coil end equivalents 222A2 is shorter than the innermost peripheral distance between the pair of first outer-coil end equivalents 222B2, the gaps 222a, 223a can be easily formed.

Figure 9A:
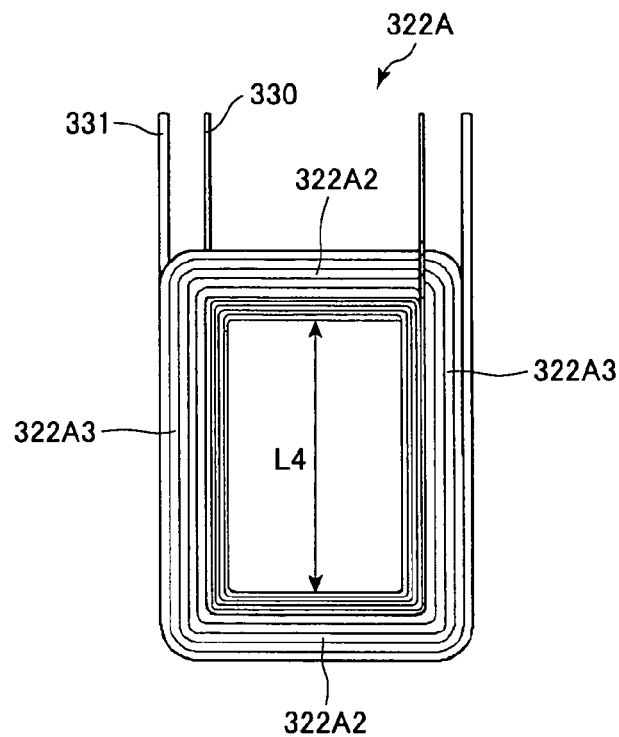
FIG. 9(a) is a plan view of the first inner-coil bundle in the motor production process for the third embodiment.
Figure 9B:
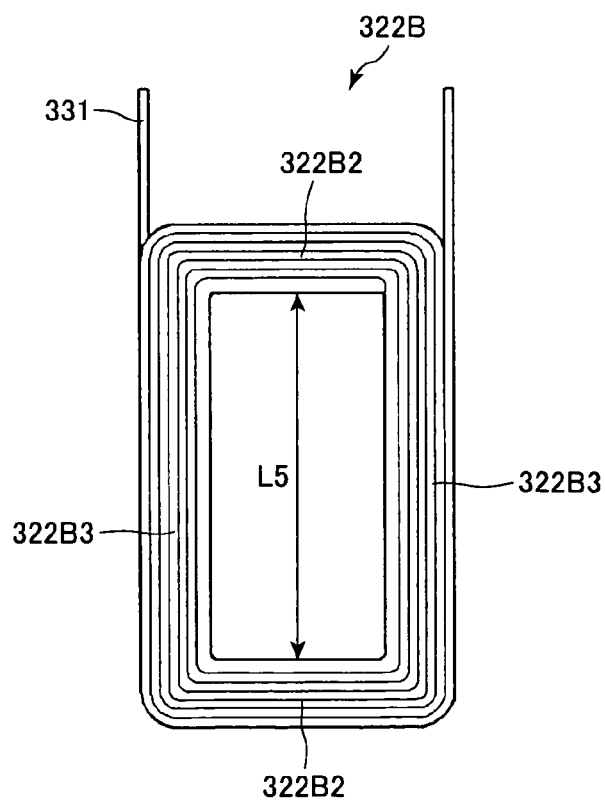
FIG. 9(b) is a plan view of a first inner-coil bundle in the motor production process for the third embodiment.

Next, another production method for the motor will be described with reference to FIG. 9(a) through 9(e). First, as shown in FIG. 9(a), a first magnet wire 330 which will function as a brake coil is wound with a specific number of turns. Further, a second magnet wire 331 which will function as a main coil is wound with a specific number of turns on the outermost periphery of the first magnet wire 330. Thus, a first inner-coil bundle 322A having a pair of first inner-coil end equivalents 322A2 (circumferential winding equivalents) and a pair of first axial inner-coil equivalents 322A3 is produced. As shown in FIG. 9(b), a third magnet wire 332 which will function as a main coil is wound with a specific number of turns. Thus, a first outer-coil bundle 322B having a pair of first outer-coil end equivalents 322B2 (circumferential winding equivalents) and a pair of first axial outer-coil equivalents 322B3 is produced.

The first inner-coil bundle 322A and the first outer-coil bundle 322B are respectively wound such that innermost peripheral distance L4 between the pair of first inner-coil end equivalents 322A2 is shorter than the innermost peripheral distance L5 between the pair of first outer-coil end equivalents 322B2. The first inner-coil bundle 322A and the first outer-coil bundle 322B are also wound such that the innermost peripheral distance between the pair of first axial inner-coil equivalents 322A3 is roughly equal to the innermost peripheral distance between the pair of first axial outer-coil equivalents 322B3. The first inner-coil bundle 322A is also wound such that the innermost peripheral distance between the pair of first axial inner-coil equivalents 322A3 is roughly equal to the distance between the deepest portions of the pair of first stator slots (not shown) in a circumferential direction of the stator core 21. The main coil of the first inner-coil bundle 322A and the main coil of the second coil bundle 322B are connected to each other with solder, and moreover, both have roughly the same number of turns.

In addition, a second inner-coil and a second outer-coil are produced by process the same as those for producing the first inner-coil bundle 322A and the first outer-coil bundle 322B. Accordingly, the second inner-coil bundle includes a pair of second inner-coil end equivalents (circumferential winding equivalents) and a pair of second axial inner-coil equivalents. The second outer-coil bundle includes a pair of second outer-coil end equivalents (circumferential winding equivalents) and a pair of second axial outer-coil equivalents.

Figure 9C:
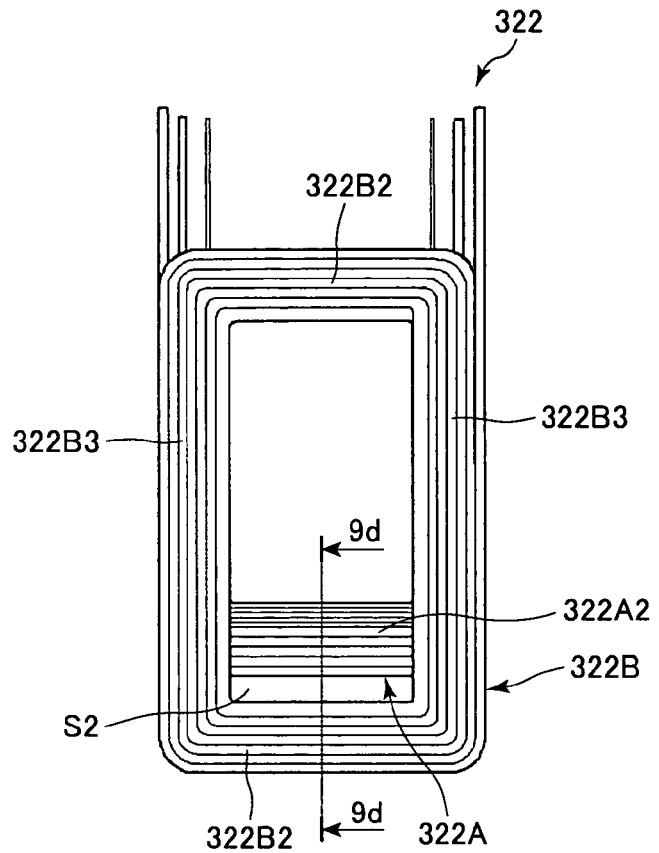
FIG. 9(c) is a plan view of the first inner-coil bundle and first outer-coil bundle when located adjacently so as to overlap.

Next, as shown in FIG. 9(c), the pair of first axial inner-coil equivalents 322A3 and the pair of first axial outer-coil equivalents 322B3 are closely overlapped with each other. One of the first inner-coil end equivalents 322A2 and one of the first outer-coil end equivalents 322B2 are also closely overlapped with each other. Since the innermost peripheral distance L5 of the first outer-coil bundle 322B is longer than the innermost peripheral distance L4 of the first inner-coil bundle 322A, a space S2 is provided between the outermost periphery of remaining first inner-coil end equivalent 322A2 and the innermost periphery of remaining first outer-coil end equivalent 322B2 (see also FIG. 9(d)).

Next, an insulating paper (not shown) is wound over one of the first axial inner-coil equivalents 322A3 and part of the first axial outer-coil equivalent 322B3 overlapped therewith, and another insulating paper (not shown) is wound in the same manner over the remaining first axial inner-coil equivalent 322A3 and part of the remaining first axial outer-coil equivalent 322B3 overlapped therewith. Consequently, the first inner-coil bundle 322A and the first outer-coil bundle 322B form a single unit, thus producing the first coil 322. A second coil by the combination of a second inner-coil bundle 323A and a second outer-coil bundle 323B can be provided by the above-described method of producing the first coil 322.

Next, the first coil 322 is set to the first coil winding part 21A (FIG. 2) of the stator core 21 (FIG. 2) in such a manner that the second coil bundle 322B is positioned radially outwardly of the first coil bundle 322A. The coil end providing the space S2 is set to oppose to the fan 7 (FIG. 1). While the second coil is also set on the second coil winding part 21B (FIG. 2) of the stator core 21 in the same manner as the first coil 322. In addition, a band (not shown) is wound between the pair of first inner-coil end equivalents 322A2 on the roughly center in the circumferential direction, such that the pair of first inner-coil end equivalents 322A2 are moved toward each other in the axial direction of the stator core 21. Another band (not shown) is also wound in the same manner on the roughly center in circumferential direction of the pair of second inner-coil end equivalents.

Figure 9D:
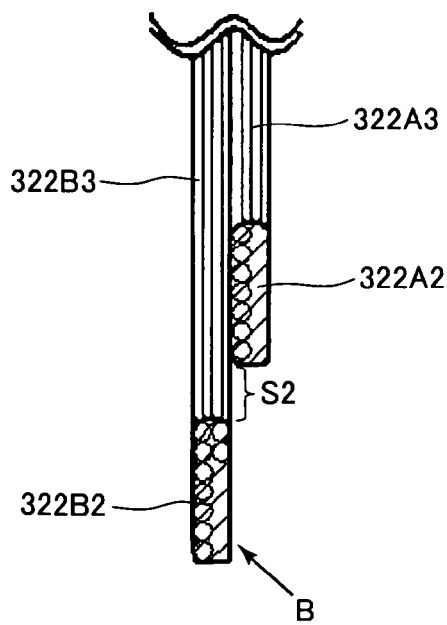
FIG. 9(d) is a cross-sectional view taken along a line 9d-9d in FIG. 9(c)
Figure 9E:
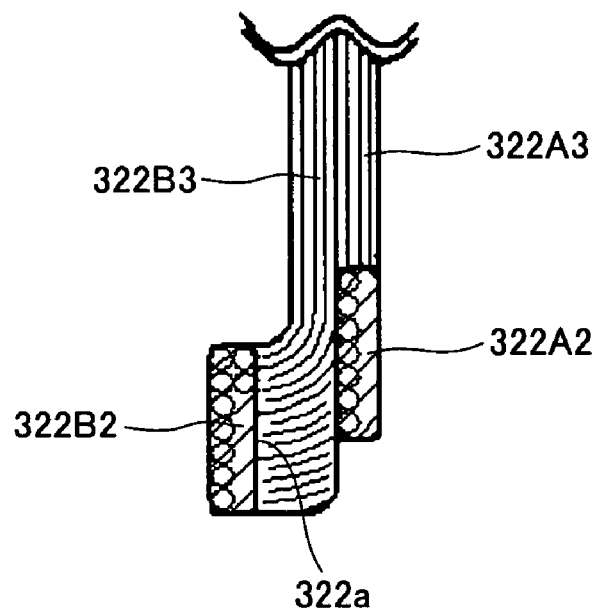
FIG. 9(e) is a view showing a first outer-coil end equivalent of the first outer-coil bundle, the first outer-coil end equivalent being bent in a direction B.

Next, as shown in FIG. 9(d), the first outer-coil end equivalent 322B2 on the side providing the space S2 is bent in a direction B, thereby deforming into a shape as shown in FIG. 9(e). Thus, a gap 322a is provided by the first inner-coil end equivalent 322A2 and the first outer-coil end equivalent 322B2. As described above, since the innermost peripheral distance L5 of the first outer-coil bundle 322B is longer than the innermost peripheral distance L4 of the first inner-coil bundle 322A, the gap 322a can be easily provided.

While the invention has been described in detail with reference to specific embodiments thereof, it would be apparent to those skilled in the art that many modifications and variations may be made therein without departing from the spirit of the invention, the scope of which is defined by the attached claims.

For example, while a gap 22a and a groove 22b were formed in the motor 20, only a gap 22a may be formed in the motor 20 without formation of the groove 22b. Moreover, the first inner-coil bundles 22A, 222A, and 322A in the first through third embodiments are composed of a brake coil and a main coil. However, these may be composed of only a main coil without the brake coil. In the first through third embodiments, the gaps 22a and 222a, and the grooves 22b and 122b were formed on both sides in the axial direction of the stator core 21. However, these may be formed on only one side opposing the fan 7.

Figure 10A:
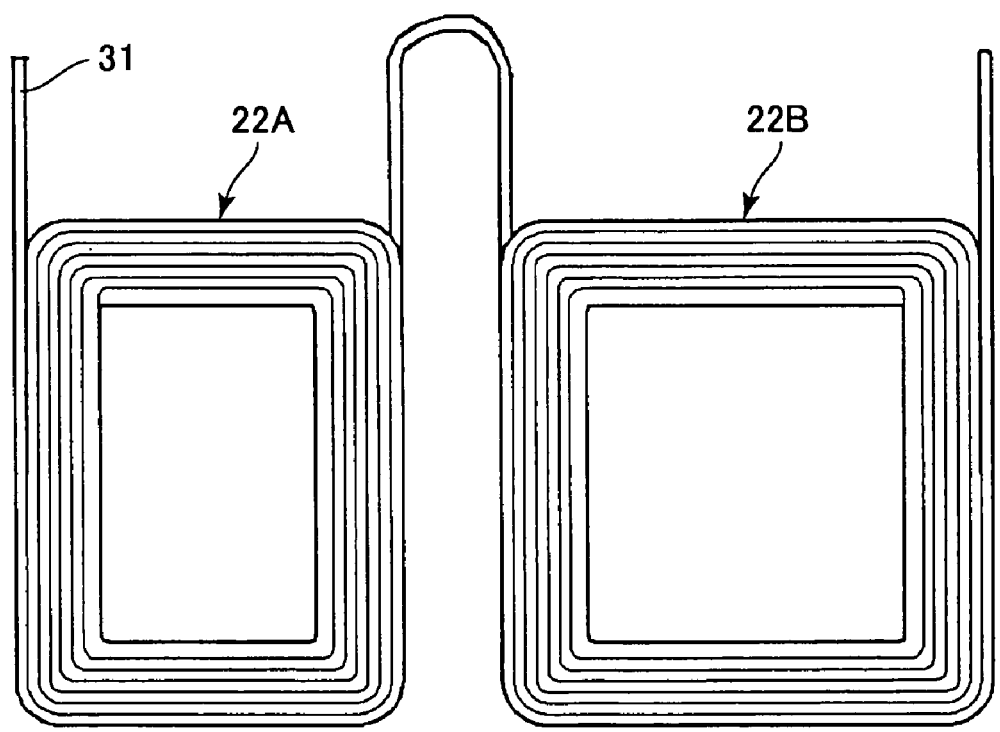
FIG. 10(a) is a plan view of main coils of the first inner-coil bundle and the first outer-coil bundle produced with a single magnet wire in the production process for the motor in the first embodiment.
Figure 10B:
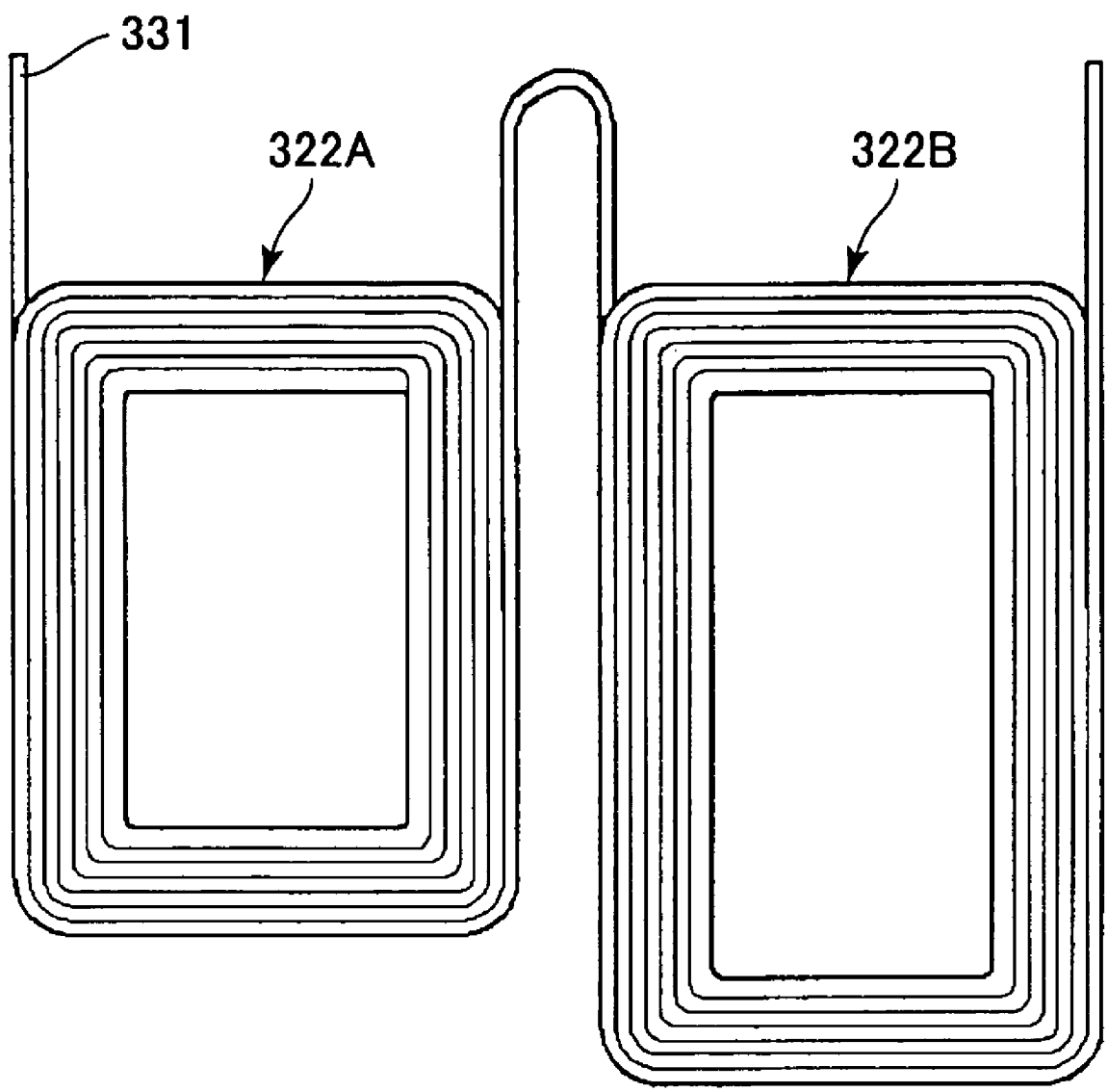
FIG. 10(b) is a plan view of main coils of the first inner-coil bundle and the first outer-coil bundle produced with a single magnet wire in another production process for the motor.

In the production methods for the motor 20 in the first embodiment (FIGS. 4(a)-5(b)) and in other production methods for the motor (FIGS. 9(a)-9(e)), the main coil of the first inner-coil bundle 22A and the main coil of the first outer-coil bundle 322A are produced using, respectively, second magnet wires 31 and 331, and third magnet wires 32 and 332, and soldered after production. However, as shown in FIGS. 10(a) and (b), the main coil of the first inner-coil bundles 22A and 322A, and the main coil of the first outer-coil bundles 22B and 322B may be produced by only one continuous magnet wires 31 and 331.

What is claimed is:

1. An electrical tool comprising:
   a housing formed with an air inlet duct and an air exhaust duct;
   a stator core fixed within the housing, the stator core including at least a first coil winding part and a second coil winding part opposing the first coil winding part, the stator core having axial ends and being formed with a center bore;
   a first coil wound on the first coil winding part;
   a second coil wound on the second coil winding part, and positioned opposite to the first coil;
   a rotor rotatably disposed in the center bore and between the first coil and the second coil, the rotor defining a circumferential direction and an axial direction; and
   a fan placed within the housing for taking air from the air inlet duct in the housing and discharging air through the exhaust duct to cool the first coil and the second coil;
   wherein the first coil and the second coil respectively include a pair of axial winding portions respectively running in the axial direction of the rotor, and a pair of circumferential winding portions projecting outward from the axial ends of the stator core while running along the circumferential direction of the rotor;
   wherein the first coil and second coil respectively include at least a first coil bundle formed of a plurality of turns including an innermost turn and an outermost turn and a second coil bundle formed of a plurality of turns including an innermost turn and an outermost turn, and at least one of a gap and a groove is formed by the first coil bundle and the second coil bundle in at least one of the circumferential winding portions, the first coil bundle being positioned radially inwardly of the second coil bundle in a radial direction of the rotor; and wherein the innermost turn of the first coil bundle has a first innermost peripheral length, and the innermost turn of the second coil bundle has a second innermost peripheral length, the first innermost peripheral length being different from the second innermost peripheral length.

2. The electric tool as claimed in claim 1, wherein the second innermost peripheral length is greater than the first innermost peripheral length, at least one of the circumferential winding portions of the second coil bundle being positioned radially outwardly of the corresponding at least one of the circumferential winding portions of the first coil bundle in the radial direction of the rotor.

3. The electric tool as claimed in claim 1, wherein the first coil bundle has a peripheral surface part defining a first wall and the second coil bundle has a peripheral surface part defining a second wall, the first wall and the second wall defining in combination a groove, a distance between the first wall and the second wall being gradually increased toward outermost peripheral surfaces of the first coil bundle and the second coil bundle in the axial direction of the rotor.

4. The electric tool as claimed in claim 1, wherein one of the first coil bundle and the second coil bundle includes at least a main coil, and remaining one of the first coil bundle and the second coil bundle only contains a main coil.

5. The electric tool as claimed in claim 4, wherein one of the first coil bundle and the second coil bundle has a brake coil to impart braking force to the rotation of the rotor.

6. The electric tool as claimed in claim 4, wherein the number of turns of the main coil of the first coil bundle and the number of turns of the main coil of the second coil bundle are approximately equal to each other.

7. The electric tool as claimed in claim 1, wherein a part of the innermost turn corresponding to the circumferential winding portion of the first coil bundle has a first circumferential length, and a part of the innermost turn corresponding to the circumferential winding portion of the second coil bundle has a second circumferential length, the first circumferential length being different from the second circumferential length.

8. The electric tool as claimed in claim 7, wherein the pair of axial winding portions of the first coil bundle and the second coil bundle respectively include a central portion running in the axial direction of the rotor and a pair of end portions respectively being connected to the pair of circumferential winding portions, at least a part of the central portion of the first coil bundle being in contact with at least a part of the central portion of the second coil bundle, and at least a part of the end portion of the first coil bundle being separated from the end portion of the second coil bundle.

9. The electric tool as claimed in claim 7, wherein the pair of circumferential winding portions of the first coil bundle and the second cool bundle respectively include a central portion running along the circumferential direction of the rotor and a pair of end portions respectively being connected to the pair of axial winding portions, at least a part of the central portion of the first coil bundle being separated from at least a part of the central portion of the second coil bundle, and at least a part of the end portion of the first coil bundle being in contact with at least a part of the end portion of the second coil bundle.

10. The electric tool as claimed in claim 1, wherein a part of the innermost turn corresponding to the axial winding portion of the first coil bundle has a first axial length, and a part of the innermost turn corresponding to the axial winding portion of the second coil bundle has a second axial length, the first axial length being different from the second axial length.

11. An electric tool comprising:
a housing formed with an inlet duct and an air exhaust duct;
a stator core fixed within the housing, the stator core including at least a first coil winding part and a second coil winding part opposing the coil winding part, the stator core having axial ends and being formed with a center bore;
a first coil wound on the first coil winding part;
a second coil wound on the second coil winding part, and positioned opposite to the first coil;
a rotor rotatably disposed in the center bore and between the first coil and the second coil, the rotor defining a circumferential direction and an axial direction; and
a fan placed within the housing for taking air from the air inlet duct in the housing and discharging air through the exhaust duct to cool the first coil and the second coil;
wherein the first coil and the second coil respectively include a pair of axial winding portions respectively running in the axial direction of the rotor, and a pair of circumferential winding portions projecting outward from the axial ends of the stator core while running along the circumferential direction of the rotor;
wherein the first coil and second coil respectively include at least a first coil bundle formed of a plurality of turns including an innermost turn and an outermost turn and a second coil bundle formed of a plurality of turns including an innermost turn and an outermost turn, and at least one of a gap and a groove is formed by the first coil bundle and the second coil bundle in at least one of the circumferential winding portions, the first coil bundle being positioned radially inwardly of the second coil bundle in a radial direction of the rotor;
wherein the innermost turn of the first coil bundle has a first innermost peripheral length, and the innermost turn of the second coil bundle has a second innermost peripheral length, the first innermost peripheral length being different from the second innermost peripheral length; and
wherein the first coil bundle and the second coil bundle have flattened cross-sectional shapes in the radial direction of the rotor.

12. The electric tool as claimed in claim 11, wherein a part of the innermost turn corresponding to the circumferential winding portion of the first coil bundle has a first circumferential length, and a part of the innermost turn corresponding to the circumferential winding portion of the second coil bundle has a second circumferential length, the first circumferential length being different from the second circumferential length.

13. The electric tool as claimed in claim 12, wherein the pair of axial winding portions of the first coil bundle and the second coil bundle respectively include a central portion running in the axial direction of the rotor and a pair of end portions respectively being connected to the pair of circumferential winding portions, at least a part of the central portion of the first coil bundle being in contact with at least a part of the central portion of the second coil bundle, and at least a part of the end portion of the first coil bundle being separated from the end portion of the second coil bundle.

14. The electric tool as claimed in claim 12, wherein the pair of circumferential winding portions of the first coil bundle and the second cool bundle respectively include a central portion running along the circumferential direction of the rotor and a pair of end portions respectively being connected to the pair of axial winding portions, at least a part of the central portion of the first coil bundle being separated from at least a part of the central portion of the second coil bundle, and at least a part of the end portion of the first coil bundle being in contact with at least a part of the end portion of the second coil bundle.

15. The electric tool as claimed in claim 11, wherein a part of the innermost turn corresponding to the axial winding portion of the first coil bundle has a first axial length, and a part of the innermost turn corresponding to the axial winding portion of the second coil bundle has a second axial length, the first axial length being different from the second axial length.

* * * * *